Aug. 25, 1964 B. A. PROCTOR 3,145,941

RECORDER-REPRODUCERS

Filed Jan. 26, 1961 8 Sheets-Sheet 1

INVENTOR.
BARTON A. PROCTOR
BY
Nolte & Nolte
ATTORNEYS

Aug. 25, 1964 B. A. PROCTOR 3,145,941

RECORDER-REPRODUCERS

Filed Jan. 26, 1961 8 Sheets-Sheet 2

INVENTOR
BARTON A. PROCTOR

Nolte & Nolte
ATTORNEYS

INVENTOR.
BARTON A. PROCTOR
BY
Nolte & Nolte
ATTORNEYS

INVENTOR.
BARTON A. PROCTOR
BY
Nolte & Nolte
ATTORNEYS

Aug. 25, 1964 B. A. PROCTOR 3,145,941

RECORDER-REPRODUCERS

Filed Jan. 26, 1961 8 Sheets-Sheet 5

INVENTOR.
BARTON A. PROCTOR
BY
Nolte & Nolte
ATTORNEYS

Aug. 25, 1964 B. A. PROCTOR 3,145,941

RECORDER-REPRODUCERS

Filed Jan. 26, 1961 8 Sheets-Sheet 6

INVENTOR
BARTON A. PROCTOR
BY
Nolte & Nolte
ATTORNEYS

INVENTOR.
BARTON A. PROCTOR
BY
Nolte & Nolte
ATTORNEYS

RECORDER-REPRODUCERS

Filed Jan. 26, 1961

INVENTOR.
BARTON A. PROCTOR
BY
Nolte & Nolte
ATTORNEYS

United States Patent Office 3,145,941
Patented Aug. 25, 1964

3,145,941

RECORDER-REPRODUCERS

Barton A. Proctor, Larchmont, N.Y., assignor, by direct and mesne assignments, to Proctor Dictating Machine Corporation, New York, N.Y., a corporation of New York Filed Jan. 26, 1961, Ser. No. 87,050
7 Claims. (Cl. 242—55.12)

This invention relates to sound recorder-reproducers of the magnetically coated tape type.

It is specifically concerned with a sound recorder-reproducer in which the tape is contained in a magazine which may readily be detached from the instrument and be replaced by another similar magazine in which other tape has already been installed and made ready for immediate recording.

It is one feature of my invention that the magazine is so designed and so mounted on the instrument that the tape may be removed and other tape installed and threaded regardless of whether the magazine is mounted on or removed from the instrument.

It is a further feature of the invention that, if desired, the instrument may be of the multi-track type and capable of use for continuous single track recording or equipped to record two or more tracks simultaneously and also capable of recording at any one of the several speeds. The recording may be either in the audible range or in the sub-audible range.

It is a further feature of my invention that instrument may be arranged for recording or reproducing when the tape is traveling in either direction and the change in the direction of travel may be accomplished automatically without perceptible interruption in the recording.

Various other features of the invention will be apparent from the following description of certain forms of embodiments thereof, said description having references to the accompanying drawings in which.

Similar reference characters designate similar parts in each of the several views.

Figure 1:
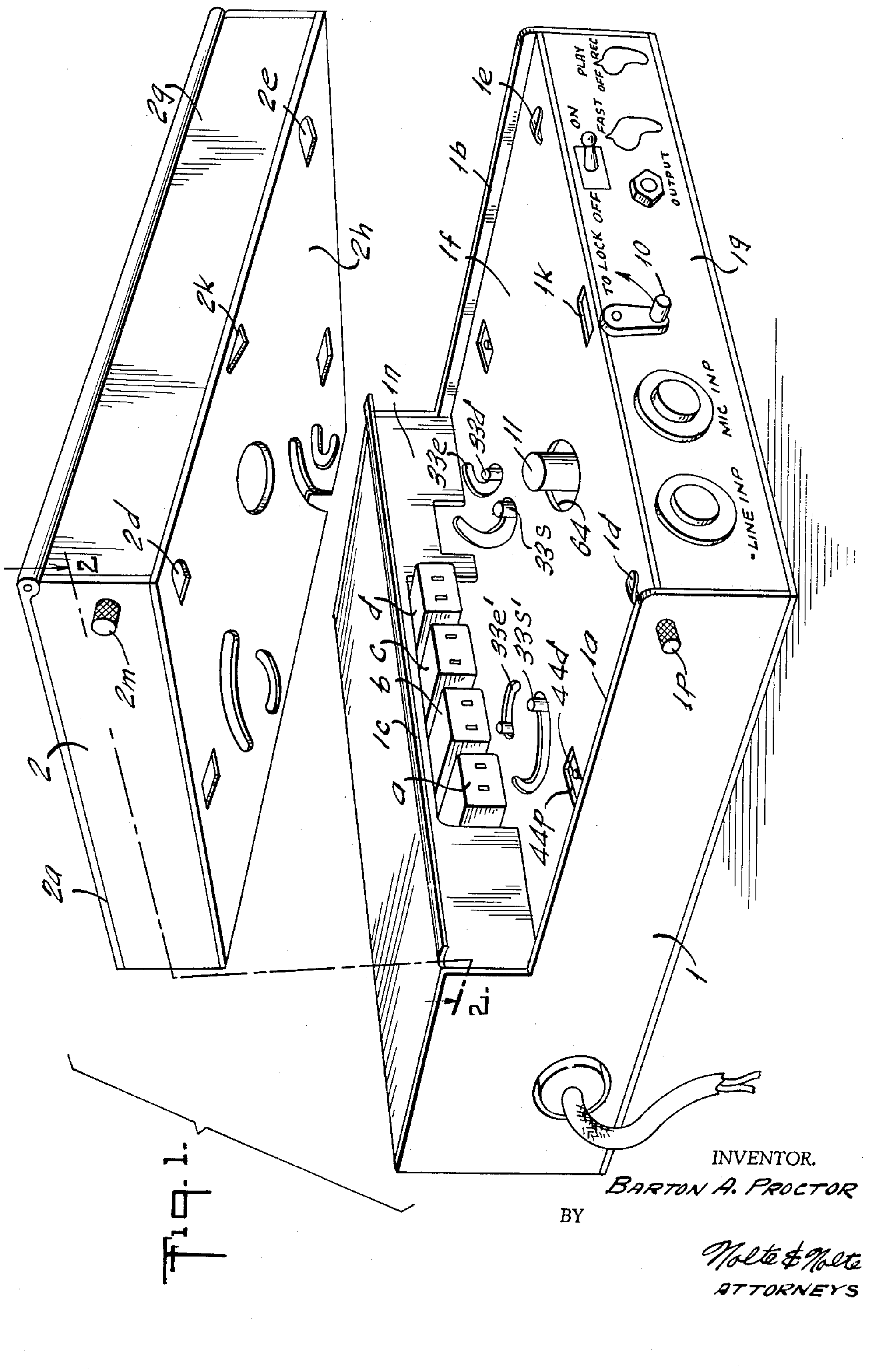
FIG. 1 is a perspective view showing the recording unit of my invention together with a magazine containing the recording tape, said magazine being shown in position for being placed on the recording unit.

FIG. 1 shows a recording unit 1 of my invention with a magazine 2 containing the recording tape, said magazine being shown in position for being placed on the unit 1. It will be noted that the unit 1 is provided with side guides 1*a* and 1*b* which hold the magazine from slipping sideways when placed on a recording unit. The unit is further provided with a lip 1*c* which fits over the cover 2*a* of the magazine when the same is in place of the unit. Retaining clips 1*d* and 1*e* are provided to enter openings 2*d* and 2*e* in the bottom wall of the magazine when the magazine is placed on top of the wall 1*f*, with the forward wall 2*g* of the magazine overhanging the forward wall 1*g* of the recording unit by a distance equal to the width of the lip 1*c*. Then when the magazine is pushed under the lip 1*c* the clips 1*d* and 1*e* ride over the upper face of the bottom wall 2*h*. As will be described hereinafter, the recording tape in the magazine will then be in operative relation to the recording heads *a*, *b*, *c* and *d* of the recording unit, these heads being combination recording and reproducing heads well known in the art. The magazine is thus firmly held in place by the lips 1*c*, side guides 1*a* and 1*b* and clips 1*d* and 1*e*. It may now be locked in position by means of a lever 10 operating a latch 1*m* (FIG. 2) which when the lever is moved counterclockwise in FIG. 1 will rotate upwardly through a slot 1*k* in the recording unit and enter a slot 2*k* in the magazine, the latter slot being provided with a cam surface 2*m*, so as to push the magazine firmly into its proper position in firm contact with wall 1*n* of the recording unit. Knobs 2*m* are provided on each side of magazine and corresponding knobs 1*p* are provided on each side of the recording unit, for facilitating the placement of the magazine into its proper position.

Figure 2:
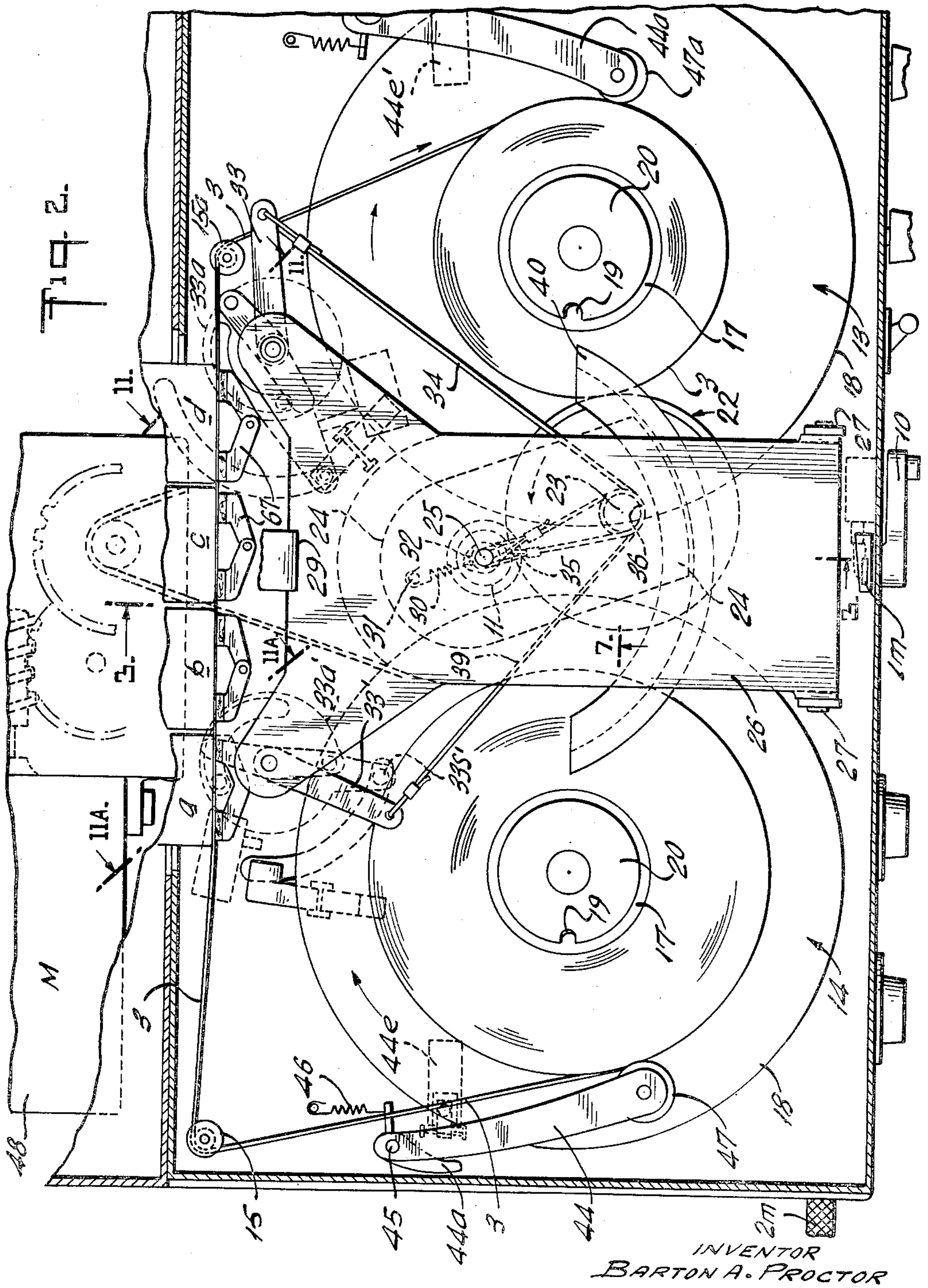
FIG. 2 is a section through the recording unit and through the magazine along the lines 2—2 looking in the direction of the arrows.

As shown in FIG. 2, the tape 3 of the magazine is contained on two reels 13 and 14, which reels at the instant shown are rotating in the direction of the arrows. At said instant, the tape is passing from reel 14 over a guide roller 15, then over the recording heads *a*, *b*, *c*, and *d* and then over a guide roller 15*a* located in the upper right hand corner of the magazine and onto reel 13. The tape on reels 13 and 14 is wound on hubs 17 (see also FIG. 7) which are permanently united with the flanges 18 of the reels 13 and 14. The hubs 17 are keyed at 19 (FIG. 2) to hub supports 20 having flanges 20*a* (FIG. 7) and mounted for rotation on the bottom wall 2*h* of the magazine by ball bearings 20*b* on a post 20c, the reels being held in place by a split ring 20d on the post.

Figures 8, 9, 10:
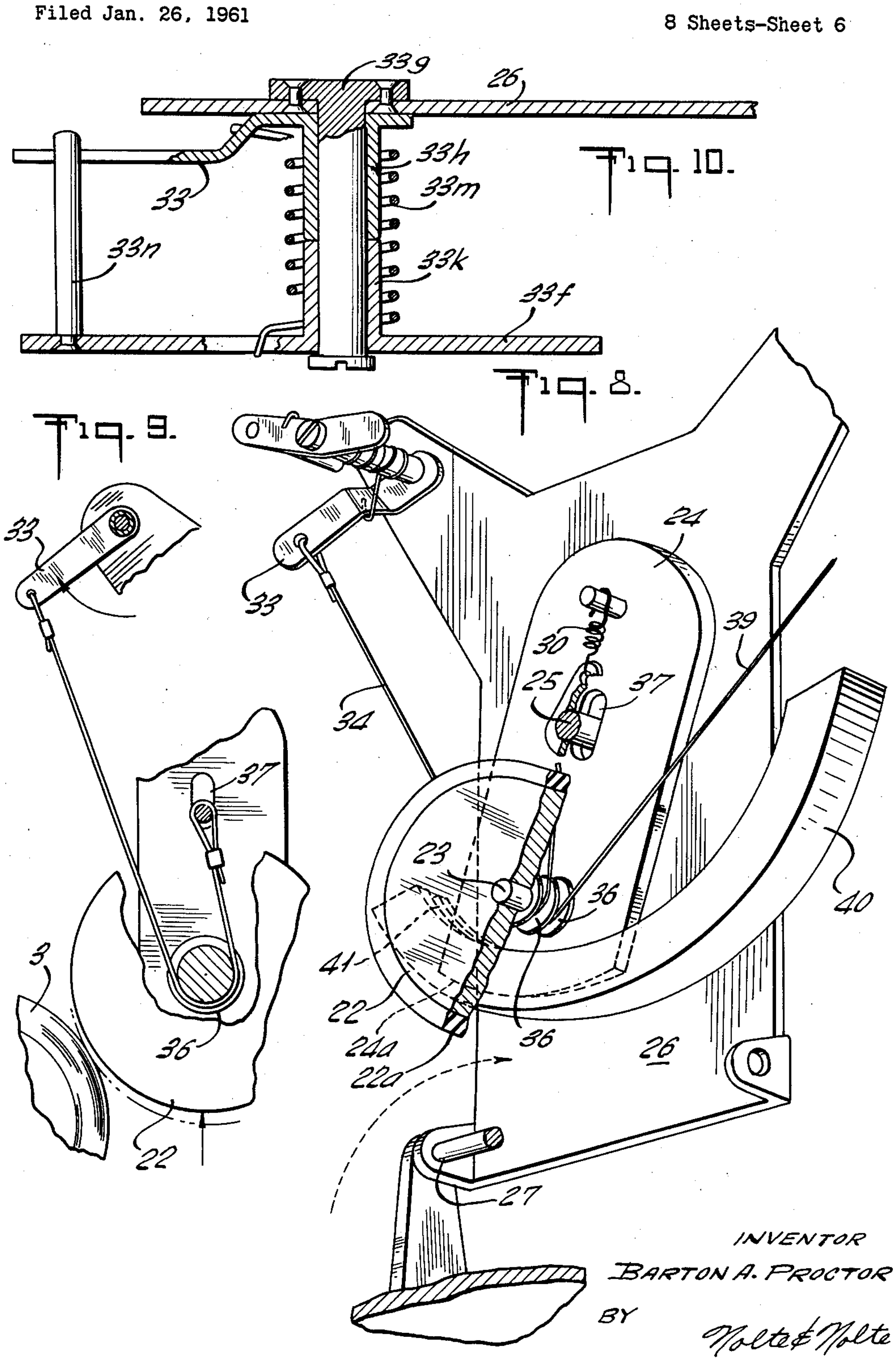
FIG. 8 is a bottom perspective view of the mechanism of FIG. 6 swung upwardly to a position for facilitating the removal and replacement of the reels of tape in the magazine.
FIG. 9 is a sectioanl view of FIG. 3 along the line 9—9 looking in the direction of the arrows.
FIG. 10 is a sectional view of a portion of FIG. 6 taken on the line 10—10 looking in the direction of the arrows.

In the position shown in FIG. 2 driving force is being applied to the tape 3 by frictional engagement of the roll of tape on reel 13 with a pulley 22 having a rubber facing 22a, the pulley being mounted for rotation on a post 23, fixed on a plate 24 (see also FIG. 8). The said plate is pivotally mounted on a stud 25 fixed on a supporting plate 26, the latter plate being mounted on hinges 27 fixed to the bottom wall 2h of the magazine 2. The supporting plate 26 may be locked in the position shown in FIGS. 2 and 6 by means of a spring clip 29 mounted on the bottom wall 2h of the magazine.

In the position shown in FIG. 2, driving force is being applied to the rubber faced pulley 22 by the drive member 11 having a facing 11a of nylon or other suitable material, which member is being continuously rotated by a mechanism which will be referred to hereinafter, registering opening 64 and 65 being provided (see FIG. 3) in the wall 1f of the unit and in wall 2h of the magazine to permit member 11 to enter the magazine. In the position shown in FIG. 2, a solenoid operated lever 33 exerts tension on a cord or cable 34 of nylon or other suitable material, one end of this cord being anchored to lever 33, the other end of this cord being anchored by a loop 35 to post 25 (see also FIG. 3). The cord 34 passes over grooved pulleys 36 mounted on post 23, which post is fixed as hereinabove noted in plate 24. The tension in cord 34 holds pulley 22 in firm contact with the roll of tape on reel 13 and with the drive member 11, thus transmitting the drive from member 11 to the tape on reel 13. The tape is thus being unwound from the reel 14 and moved at constant linear speed past the recording heads a, b, c and d and is being wound on reel 13.

The movement of the tape from the one reel to the other is controlled by solenoids 33a and 33a' one or the other which is energized, for this purpose.

Figure 6:
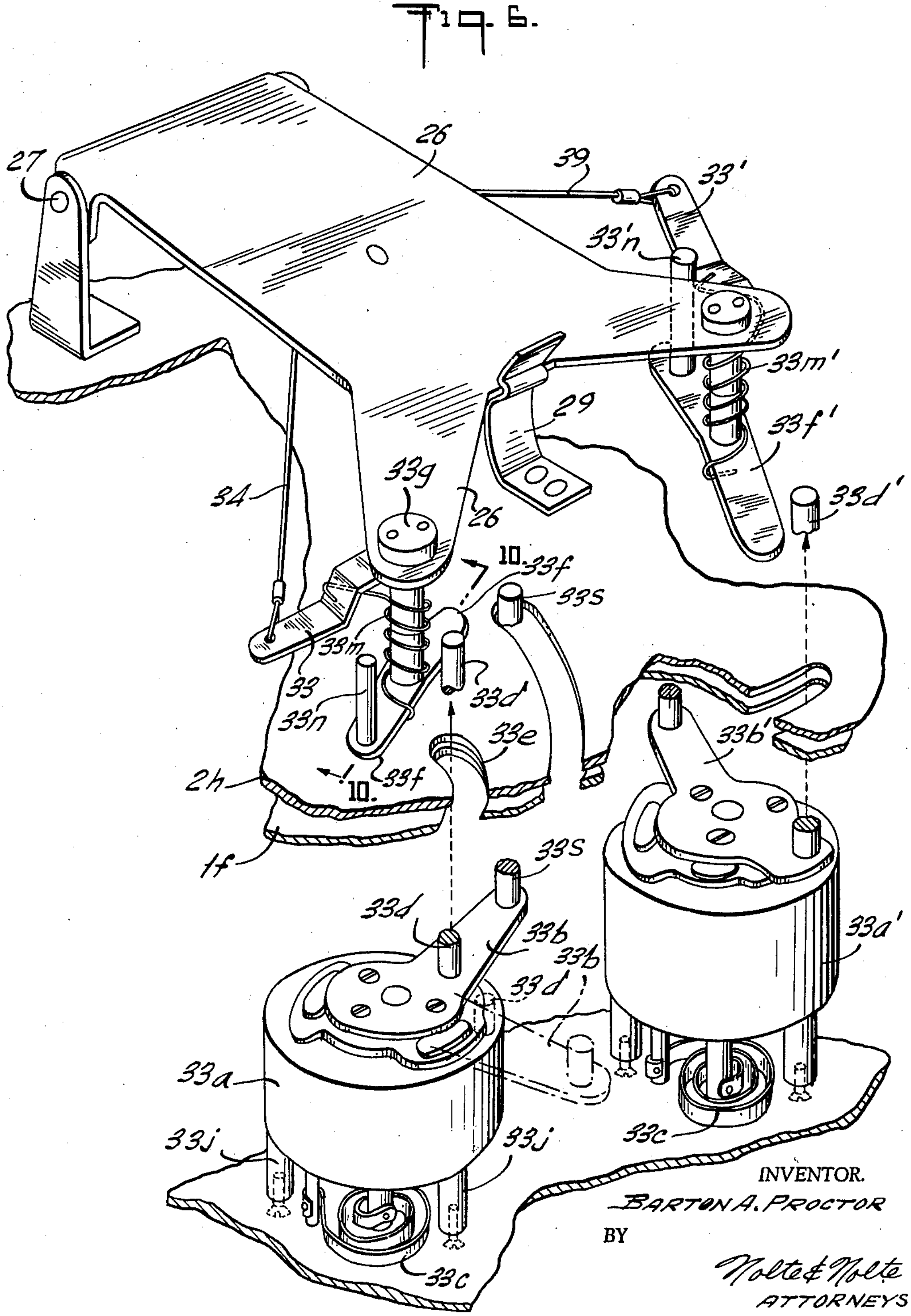
FIG. 6 is an exploded perspective view of a portion of the mechanism for driving the tape, as viewed from the tape of FIG. 2.

In FIG. 6 the solenoid 33a is shown in an energized position, mounted by studs 33j on the bottom wall of the recording unit. In its energized position the torque of the solenoid serves to exert a pull on cord 34, this pull being transmitted to the cord as follows: Energization of solenoid 33a rotates arm 33b thereof against the bias of a spring 33c through approximately 95° from the dotted line position shown in FIG. 6 to the full line position. A stud 33d is mounted on arm 33b, and passes through the top plate 1f of the recording unit, and through the bottom wall 2h of the magazine, registering arcuate slots 33e being provided in the unit and magazine for this purpose. The lever 33 to which cord 34 is connected is in operative relationship with a lever 33f (see also FIG. 10), this relationship being brought about by means of a stud 33g fixed in the supporting plate 26 hereinabove referred to. Levers 33 and 33f are provided with sleeves 33h and 33k revolvable on stud 33g. A spring 33m with its ends anchored respectively on lever 33 and lever 33f normally holds a stud 33n of lever 33f in engagement with lever 33. The stud 33d extends across the path of lever 33f, as shown in FIG. 6, when the magazine is in place on the recording unit. As a consequence, when the solenoid 33a is energized and turns the lever 33b from the dotted to the full line position of FIG. 6, the stud 33d engages against lever 33f, thus causing the spring 33m to exert pull on cord 34. The consequence of this is that the pulley 22 is brought into driving engagement with the roll of tape on reel 13, as heretofore explained.

As the roll of tape on reel 13 builds up, the pulley 22 which is in driving engagement with the roll of tape, is gradually forced clockwise in FIG. 2, with the result that cord 34 pulls lever 33 clockwise in FIGS. 2 and 6. Spring 33m is provided to permit lever 33 to move clockwise about stud 33g with lever 33f remaining in the position shown in FIG. 6, where it is being held by stud 33d operated by the solenoid 33a. As a result, lever 33 moves away from the stud 33n as shown in FIG. 6, the stud 33n remaining in the position shown as long as solenoid 33a continues to be energized.

Automatic means are provided for stopping the movement of the tape when the reel from which the tape is being unwound reaches a point where there are only a few wraps of tape left on the corresponding hub 17. In FIG. 2, in which the tape, as above, noted, is shown as being unwound from reel 14, this stoppage is brought about by operation of a lever 44 (see also FIG. 11D) pivoted at 45 to the bottom wall 2h of the magazine and pressed by a spring 46 toward the roll of tape on reel 14. A roller 47, mounted in the end of lever 44, rides continuously on the roll of tape. It may here be noted that in thus riding on the tape it serves also the purpose of a keeper for preventing the tape from becoming loose on the reel. When only a few turns of the tape are left on hub 17, the lever 44 by means of a pawl 44a integral therewith operates a right angle lever 44b pivoted at 44c in a bracket 44k mounted on the bottom wall 2h of the magazine, a spring 44m being provided to bias the leg 44' of lever 44b to the upright position shown in FIG. 11D. Lever 44b, then operates the plunger 44d of a microswitch 44e located in the body of the recording unit 1 and mounted under the top plate 1f thereof, registering openings 44p being provided to permit this operation.

Microswitch 44e causes the motor 48 (FIG. 2) to stop, as e.g., by operating an automatic switch (not shown) which breaks the circuit of the motor. The movement of the pipe 3 is thus interrupted. Switch 44e also causes the de-energization of solenoid 33a, this action being simultaneous with the stoppage of the motor. The de-energization of solenoid 33a causes the lever 33b to be returned from the full line into the dotted line position of FIG. 6 at which it is held by a stop (not shown), this movement being brought about by the solenoid spring 33c. As a consequence, stud 33d rotates clockwise in FIG. 6 so that stud 33n is free to engage lever 33. Stud 33d, however, continues its clockwise movement beyond the point at which stud 33n engages lever 33, so that there will be clearance between stud 33d and lever 33f, the purpose of this clearance being to permit the operator to swing the supporting plate 26 upwardly about its pivot 27, so that the reels of the tape 13 and 14 may be removed at this point if the operator so desires.

Figures 11, 11A:
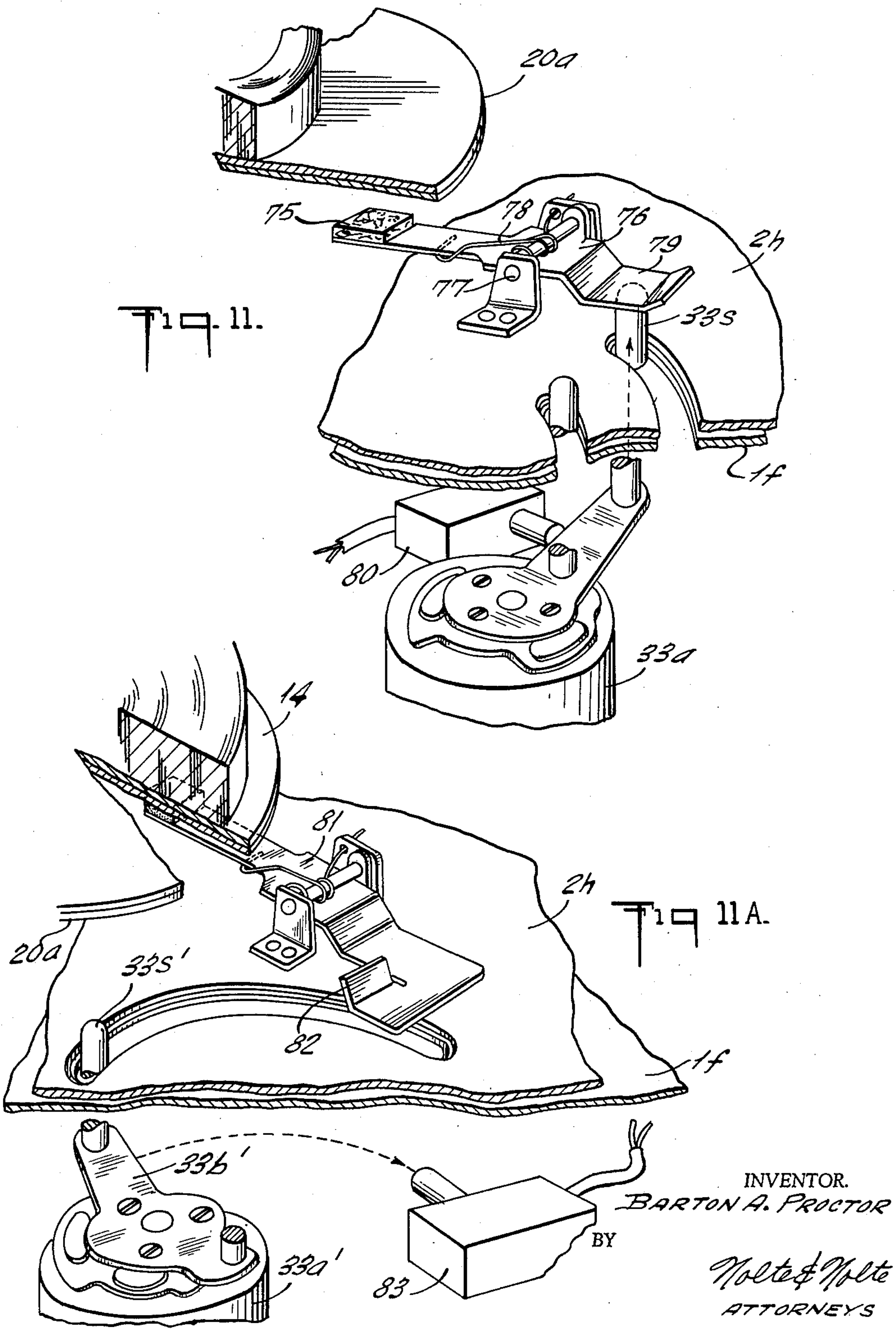
FIG. 11 is a perspective view of the reel brake mechanism as viewed from line 11—11 of FIG. 2 looking in the direction of the arrows.
FIG. 11A is a perspective view of the reel brake mechanism as viewed from line 11A—11A of FIG. 2 looking in the direction of the arrows.
Figures 11B, 11C, 11D:
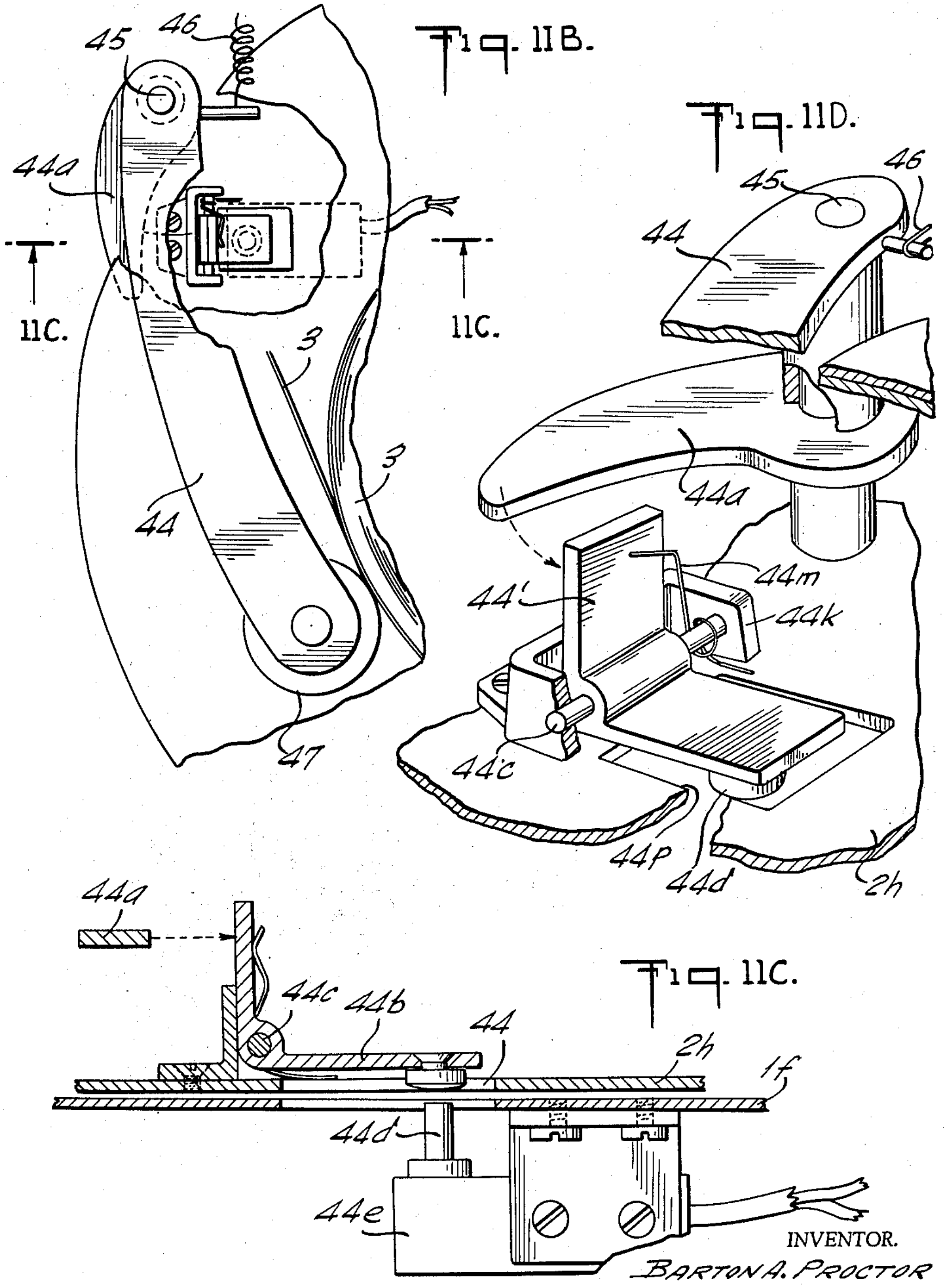
FIG. 11B is an enlarged plan view of a portion of the reel central mechanism on the left hand side of FIG. 2.
FIG. 11C is a cross section of FIG. 11B along the line 11C—11C looking in the direction of the arrows.
FIG. 11D is a fragmentary perspective view of a portion of the mechanism in FIG. 11C.

A further consequence of the de-energization of solenoid 33a is the application of a brake to reel 13. This brake illustrated in FIGS. 11 and 11A and consists of a friction pad 75 carried on a lever 76 pivotally mounted on the bottom wall 2h of the magazine. A spring 78 is biased to hold the friction pad 75 in engagement with the flange 20a on which the reel of tape 13 is supported. When, however, solenoid 33a is energized (in which position it is shown in FIG. 11), the stud 33s is in engagement with the under surface of a depressed portion 79 of lever 76 so that friction pad 75 is out of contact with flange 20a. When the solenoid is de-energized, stud 33s slides out from under portion 79, permitting the spring 78 to apply the brake to the reel.

The de-energization of solenoid 33a also causes the operation of microswitch 80, the purpose of which is similar to that of switch 83 explained hereinafter.

If now the operator wishes to reverse the movement of the tape, so as to cause the recordation thereon or playback therefrom by another one of the recording heads, he closes a circuit, not shown, which energizes the solenoid 30a', the said solenoid being generally similar to solenoid 33a'. Energization of solenoid 33a causes the stud 33d' by moving counter clockwise to engage lever 33f' which lever through spring 33m' communicates this rotation to lever 33' which in an un-energized position of the arm 33b' normally is in engagement with a stud 33n' on the lever 33f'. Subsequently the lever 33' exerts a pull on cord 39. The pull on cord 39 brings the driving pulley 22 into engagement with the tape on reel 14, this movement being brought about because one end of the cord 39 is attached to lever 33' and the other end being anchored on stud 25, the intermediate portion of the cord being passed over the pulley 36. After pulley 22 has thus been swung into contact with the tape of reel 14, lever 33' continues its clockwise movement in FIGS. 2 and 6 and in doing so, pulls the pulley 22 into engagement with the drive pulley 11, so that driving contact has now been established from drive pulley 11 through pulley 22 to the reel 14.

Figures 3, 7:
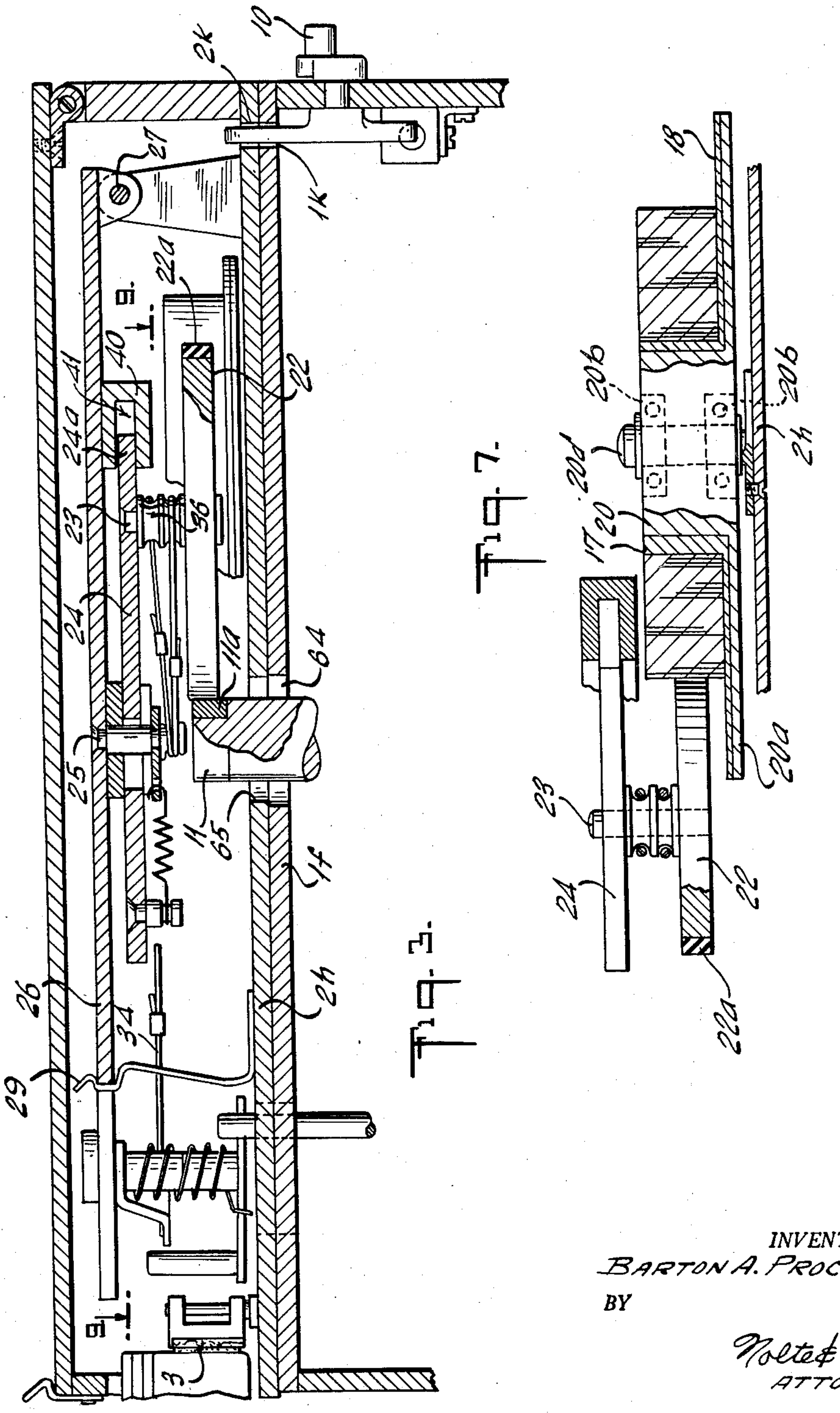
FIG. 3 is a section of FIG. 2 looking in the direction of the arrows.
FIG. 7 is a section of FIG. 2 along the lines 7—7, looking in the direction of the arrows.

As seen in FIGS. 2, 3 and 8, a U-shaped guide bracket 40, formed in a crescent shape, is provided to support in its groove 41 (FIG. 8) the extremity 24*a* of plate 24 as the plate 24 is shifted from right to left and vice versa as seen in FIG. 2. This bracket 40 therefore maintains the plate 24, and the rubber faced roller 22 supported thereon by post 23, in a substantially longitudinal horizontal position.

Simultaneously with this operation, the stud 33*s'* of solenoid 33*a'* (see also FIG. 11A) rotates into engagement with the brake lever 81, the latter lever being provided with an offset position 82 under which stud 33*s'* engages the lever 81 to release the brake on reel 14. The rotation of the arm 33*b'* also actuates microswitch 83, which is connected by circuits (not shown) to start the driving motor in the reverse direction. The brake on the other reel 13 remains in its applied position, so as to apply tension to the tape as it unwinds from reel 13. The direction of rotation of reels 13 and 14 is now the reverse of that indicated in FIG. 2 by the arrows, and the recordation on the tape proceeds with the tape running in the said reverse direction until interrupted manually by the operator or automatically at the time when reel 13 is substantially completely unwound, the automatic operation at the end of reel 13 being similar to that at reel 14, previously described.

The machine may thus be arranged to make a single trip of the tape and to come to an automatic stop at the end of this trip. But it may also be arranged to reverse itself automatically at the end of each trip, so that continuous recording is obtained with a new recording head coming into play at the beginning of each trip. To obtain such automatic reversal at the end of the travel of the tape from left to right, switch 44*e* adjacent reel 14 instead of causing the motor to stop as above described is arranged to cause a reversal thereof and switch 44', adjacent reel 13 is caused to do likewise at the end of the travel of the tape in the reverse direction. It will thus be seen that it is possible to obtain continuous recording back and forth of four tracks (or more if desired), one by each of the staggered recording heads, *a, b, c* and *d* (or additional ones). If desired, however, the circuits may be so connected that all four or any other desired number may be recorded simultaneously in one direction. Means may also be provided, if desired, to shut off the machine completely at the end of the last recordation.

Figures 4, 5:
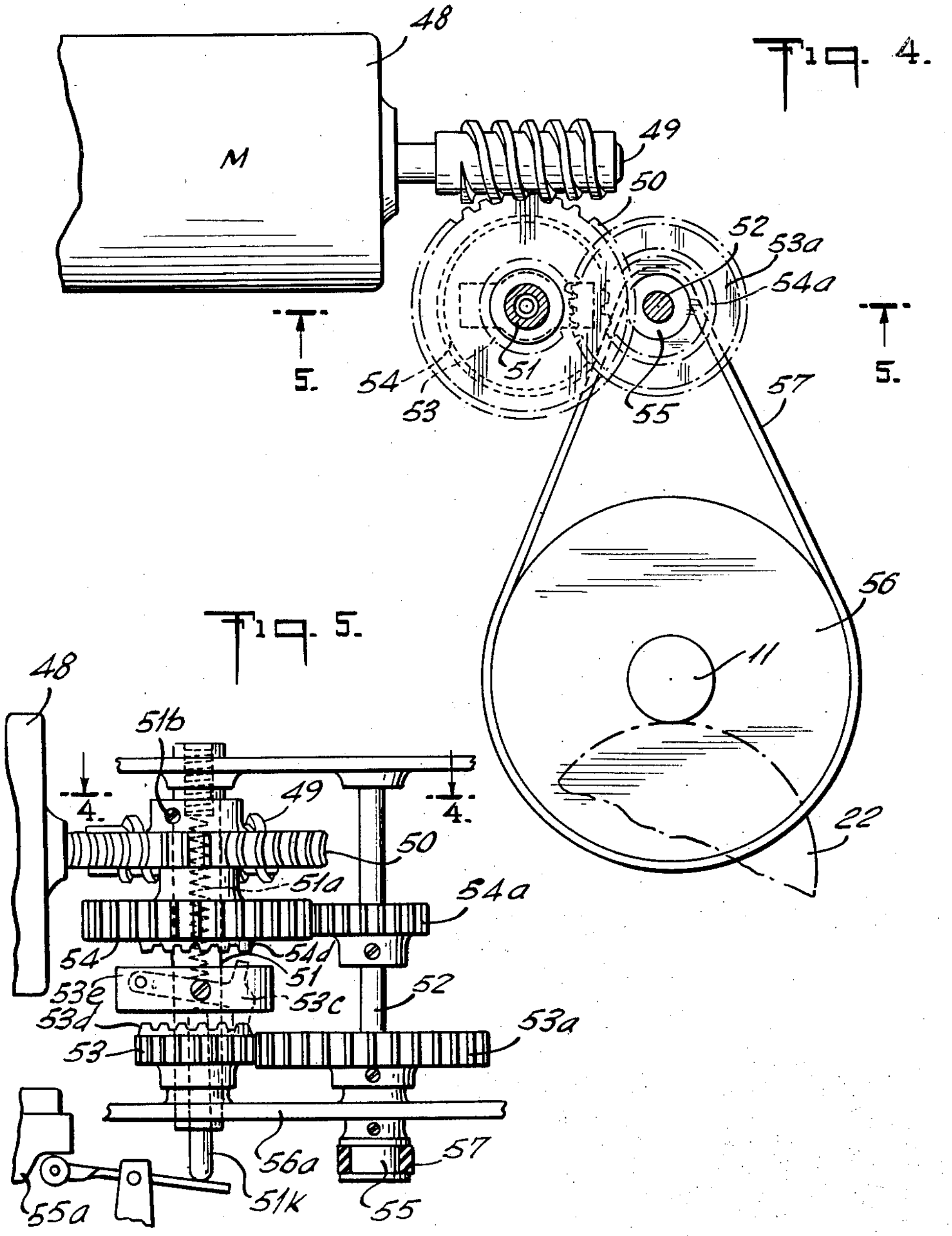
FIG. 4 is a fragmentary plan view of the motor drive and change speed mechanism of my invention, incorporated in said recording unit.
FIG. 5 is a sectional view of FIG. 4 along the lines 5—5, looking in the direction of the arrows.

The motor 48 (see FIGS. 4 and 5) is arranged to drive the belt 57 at two different speeds, the low speed being the recording speed and the high speed being the rewind speed. In FIG. 5, the mechanism is shown in the recording speed position. The motor is provided with a worm 49 operating a worm wheel 50, the said worm wheel being mounted on a hollow shaft 51 revolving in bearings in an oiltight casing 56*a*, a pin 51*b* being provided to affix the worm wheel to the shaft. Mounted on shaft 51 and free to revolve thereon are a low speed gear 53 and a high speed gear 54, the latter gears being permanently in mesh with gears 53*a* and 54*a* keyed to shaft 52. Mechanism is provided for driving shaft 52 by one or the other of the two gears 53 or 54. This mechanism consists of a clutch finger 53*c* which, when in the position shown, engages a toothed clutch ring 53*d* on gear 53, and which in its alternate position engages toothed clutch ring 54*d* on gear 54. The finger 53*c* is pivoted in a carrier 53*e*. A spring 51*a* is provided to hold finger 53*c* normally in the position shown, in which position the low speed gearing 53–53*a* is effective to drive the pulley 55, the belt 57 and the mechanism associated therewith at recording speed. When the rotary solenoid 55*a* is energized, it operates the plunger 51*k* on hollow shaft 51 against the force of spring 51*a* into operative relationship with the toothed clutch ring 54*d*, thus operating the high speed gearing. The low speed gearing is used for recording and for playback, and the high speed gearing is used for rewinding and for enabling the operator to quickly find any particular portion of the tape.

I have described what I believe to be the best embodiments of my invention. I do not wish, however, to be confined to the embodiments shown, but what I desire to cover by Letters Patent is set forth in the appended claims.

I claim:

1. In combination, a pair of fixedly located shafts, a pair of circular reels mounted on said shafts and adapted to receive recording tape with one end thereof partially wound on one of said reels and the other end partially wound on the other of said reels, a driving member constructed and arranged to have a first driving position, and a second driving position, motor means for turning said driving member in either direction in said first and second positions, and means whereby said driving member in one or the other of said driving positions is yieldingly urged into frictional driving engagement with a roll of tape on one or the other of said reels to wind the tape on either reel and is free to move away from the center of the reel as the roll of tape builds up thereon, said driving member having a neutral position in which it is out of driving engagement with the tape on either of said reels and means for biasing the driving member to said neutral position.

2. A tape recorder comprising a base unit, a magazine, said base unit having a portion for receiving the magazine thereon, a pair of reels for recording tape contained in said magazine, and mechanism for revolving one of said reels to thereby wind the tape on said reel and unwind the same from the other, said mechanism comprising a driving member mounted to oscillate from driving engagement with the roll of tape on one of said reels into driving engagement with the roll of tape on the other of said reels, motor means connected to said driving member for turning it in either direction, and means in said base unit for selectively moving and yieldingly urging said member into driving engagement with the tape on one or the other of said reels for moving the tape at a substantially constant linear speed in either direction, the instantaneous direction of rotation of said reels being the same and the instantaneous direction of rotation of said driving member being opposite to that of said reels.

3. A tape recorder as set forth in claim 2, in which said driving member has a neutral position and in which means are provided for biasing said driving member to said neutral position.

4. A tape recorder as set forth in claim 3, in which mechanism is provided for moving said driving member from a position within said base unit to a driving position in said magazine and for retracting the driving members into the base unit.

5. A tape recorder comprising a pair of flanged reels adapted to receive a recording tape being pivotally wound on each of said reels, drive means projecting substantially between said reels, cable means connected to said drive means, means connected to said cable means to selectively move said drive means to contact said tape on either one of said reels, and sensor control means for selectively stopping and reversing the movement of said tape from one of said reels to the other one of said reels.

6. A tape recorder according to claim 2, wherein said means for selectively moving said member includes a rotary solenoid.

7. A tape recorder according to claim 5, wherein said means connected to said cable means includes rotary solenoid means linked to said cable means for, causing said cable means to selectively move said drive means to contact the tape on either one of said reels, and said sensor means is coupled to said rotary solenoid means to actuate same at a predetermined instance to selectively change said selective contact relationship between said drive means and said reels.

References Cited in the file of this patent

UNITED STATES PATENTS

| | | |
|---|---|---|
| 2,647,435 | Nemeth | Aug. 4, 1953 |
| 2,657,871 | Pettus | Nov. 3, 1953 |
| 2,813,686 | Schroter | Nov. 19, 1957 |
| 2,919,866 | Minott | Jan. 5, 1960 |
| 2,952,010 | Demer et al. | Sept. 6, 1960 |
| 2,989,260 | Panissidi | June 20, 1961 |